US008389888B2

(12) United States Patent
Allimant et al.

(10) Patent No.: US 8,389,888 B2
(45) Date of Patent: Mar. 5, 2013

(54) PLASMA TORCH WITH A LATERAL INJECTOR

(75) Inventors: Alain Allimant, Montfavet (FR); Dominique Billieres, Saint Saturnin les Avignon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 0 days.

(21) Appl. No.: 13/256,073

(22) PCT Filed: Mar. 12, 2010

(86) PCT No.: PCT/IB2010/051085

§ 371 (c)(1), (2), (4) Date: Nov. 17, 2011

(87) PCT Pub. No.: WO2010/103497

PCT Pub. Date: Sep. 16, 2010

(65) Prior Publication Data

US 2012/0055907 A1 Mar. 8, 2012

(30) Foreign Application Priority Data

Mar. 12, 2009 (FR) ..................................... 09 01158

(51) Int. Cl.
*B23K 10/00* (2006.01)

(52) U.S. Cl. ........... 219/121.5; 219/121.51; 219/121.48; 219/121.47; 219/76.16; 313/231.41

(58) Field of Classification Search ............. 219/121.47, 219/121.48, 121.51, 121.52, 121.5, 74, 75, 219/121.36, 121.54, 76.16; 313/231.41, 313/231.51

See application file for complete search history.

(56) References Cited

U.S. PATENT DOCUMENTS 3,313,908 A 4/1967 Unger et al.
3,591,759 A 7/1971 Stand (Continued)

FOREIGN PATENT DOCUMENTS

WO WO 95/35647 12/1995
WO WO 96/18283 6/1996
WO WO 01/05198 1/2001

OTHER PUBLICATIONS

International Preliminary Report on Patentability and Written Opinion of the International Searching Authority, dated Sep. 13, 2011 in International Application No. PCT/IB2010/051085 (with English translation).

(Continued)

*Primary Examiner* — Mark Paschall
(74) *Attorney, Agent, or Firm* — Oliff & Berridge, PLC

(57) ABSTRACT

The invention relates to a plasma torch, comprising: a plasma generator comprising a cathode extending along an axis X and an anode (24), the cathode and the anode being arranged so as to be capable of generating, in a chamber (26), an electric arc between the anode and the cathode due to an electrical voltage, the plasma generator also comprising a plasmagen gas injection device (30) comprising an injection pipe (72) leading, along an injection axis ($I_i$), to an injection opening (74) in the chamber; a means for injecting a material to be discharged into a plasma flow generated by said plasma generator, the plasma torch being characterized in that: the relationship R" between: the radial distance ($y_i$) of said injection opening, defined as the minimum distance between the axis X and the center of said injection orifice; the largest transverse size ($D_C$) of the cathode in the region of the chamber downstream from the position $P_{AC}$, wherein $P_{AC}$ denotes the axial position of maximum radial mutual encroachment of the anode and the cathode, is less than 2.5; and the projection of the injection axis ($I_i$) into a transverse plane passing through the center of the injection orifice of said injection conduit forms an angle β less than 45° with a radius extending into said transverse plane and passing through the axis X and through the center of said injection orifice.

20 Claims, 7 Drawing Sheets

U.S. PATENT DOCUMENTS

| | | | | |
|---|---|---|---|---|
| 4,649,257 | A | 3/1987 | Yakovlevitch et al. | |
| 5,214,263 | A | 5/1993 | Sakuragi | |
| 5,332,885 | A | 7/1994 | Landes | |
| 5,403,399 | A * | 4/1995 | Kurihara et al. | 118/723 DC |
| 5,406,046 | A | 4/1995 | Landes | |
| 5,420,391 | A | 5/1995 | Delcea | |
| 5,444,209 | A | 8/1995 | Crawmer et al. | |
| 5,591,356 | A | 1/1997 | Sakuragi et al. | |
| 5,736,708 | A | 4/1998 | Delzenne | |
| 6,202,939 | B1 * | 3/2001 | Delcea | 239/79 |
| 6,392,189 | B1 * | 5/2002 | Delcea | 219/121.5 |

OTHER PUBLICATIONS

French Search Report dated Nov. 10, 2009 in French Patent Application No. 0901158 (with English translation).

* cited by examiner $l_2$
$\beta_2$
$74_2$ $l_1$
$\beta_1$
$74_1$

A
A
$P_1$
B
B
$P_2$
30
X
$y_2$
$=y_1$

Fig.9
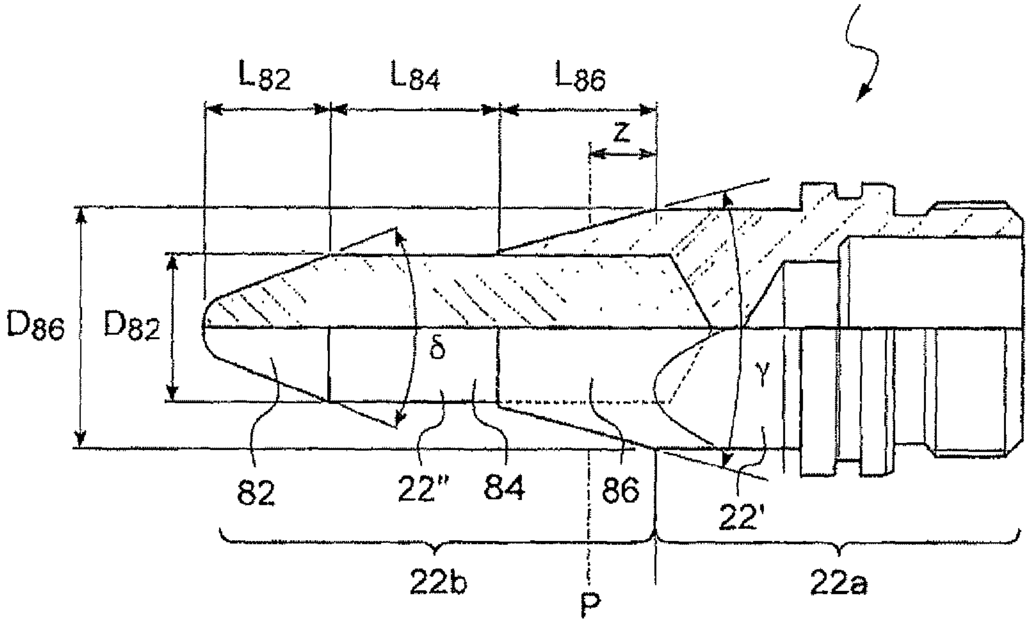
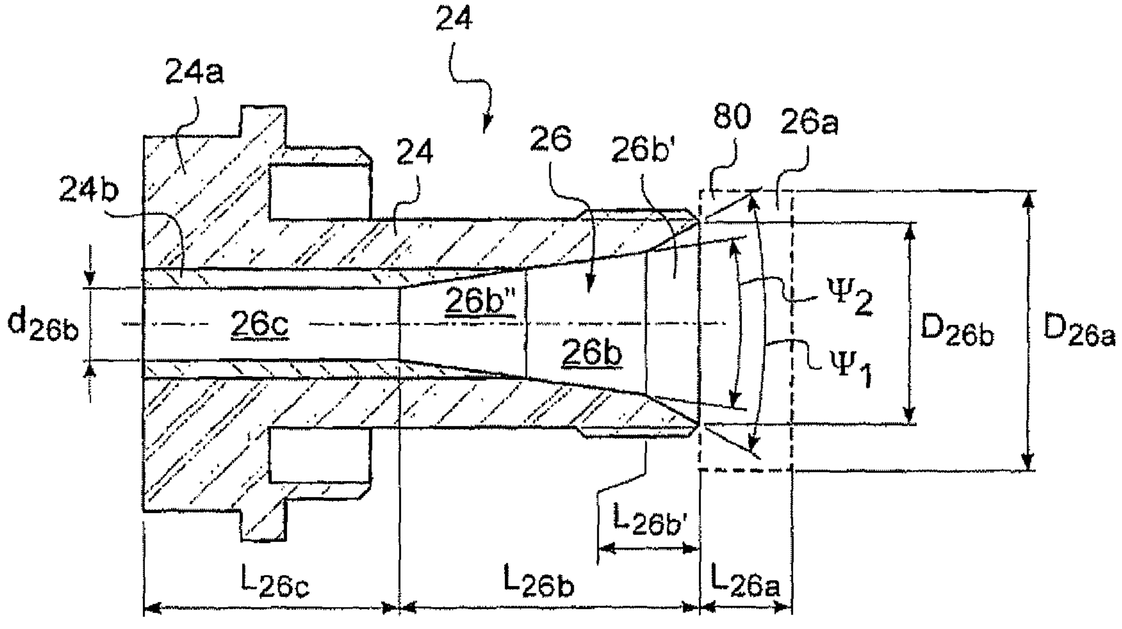
Fig.10

PLASMA TORCH WITH A LATERAL INJECTOR

BACKGROUND OF THE INVENTION

The invention relates to a plasma generator and a plasma torch employing such a plasma generator.

Plasma spraying is used to form a coating on a substrate. It generally consists in producing an electric arc, in blowing a plasmagen gas through this electric arc so as to generate a very high-temperature, high-speed plasma flux, then in injecting into this plasma flux particles so as to spray them onto the substrate. The particles melt, at least partially, in the plasma and can thus adhere well to one another and to the substrate when they cool. This technique may thus be used to coat the surface of a substrate made of a metal, ceramic, cermet, polymer, organic material or a composite, in particular a composite comprising an organic matrix. This technique is especially used to coat parts having various shapes that have for example planar or axisymmetric geometries, especially cylindrical geometries, or complex geometries, these parts possibly having various sizes—the only limit being access by the jet of particles. The aim may be, for example, to provide a substrate with a surface functionality such as wear resistance, or to modify the friction coefficient, the thermal barrier or the electrical insulation.

This technique may also be used to manufacture bulk parts, by way of a technique called "plasma forming". By virtue of this technique it is thus possible to apply a coating a number of millimeters in thickness, even more than 10 mm in thickness.

Plasma torches, or plasmatrons, are for example described in WO 96/18283, U.S. Pat. Nos. 5,406,046, 5,332,885, WO 01/05198 or WO 95/35647 or U.S. Pat. No. 5,420,391.

The performance parameters of a plasma torch for industrial purposes may be said to be the following:

- high spray productivity, the spray productivity being defined as the amount of material deposited per unit time;
- high deposition efficiency, the deposition efficiency being defined as the ratio, in wt %, between the amount of material deposited and the amount of material injected into the plasma flux;
- maximum coating quality, and in particular the ability to produce a uniform and reproducible coating, including with a high material flow rate;
- minimum energy consumption;
- lowest possible maintenance time with the highest possible time interval between two consecutive maintenance operations; and
- reduced contamination via loss of the cathode material.

One object of the exemplary embodiments is to provide a plasma torch that at least partially meets these criteria.

SUMMARY OF THE INVENTION

For this purpose, exemplary embodiments include a plasma generator comprising:

- a cathode extending along an axis X and an anode, the cathode and the anode being placed so as to be able to generate, in a chamber, an electric arc between the anode and the cathode under the effect of a voltage; and
- a device for injecting a plasmagen gas comprising an injection duct opening via an injection orifice into the chamber.

In a first principal embodiment, the ratio R between:

- the axial distance x between the axial position $p_{AC}$ of minimum radial distance between the anode and cathode and the axial position $p_i$ of said injection orifice; and
- the largest transverse dimension $D_C$ of the cathode in the region of the chamber downstream of the position $p_{AC}$, called the "arc chamber", is smaller than 3.2, preferably smaller than 2.5 and/or larger than 0.5.

In a second principal embodiment, the ratio R' between:

- the axial distance x' separating the axial position $p_C$ of the downstream end of the cathode and the axial position $p_i$ of said injection orifice; and
- the largest transverse dimension $D_C$ of the cathode in the arc chamber, is smaller than 3.5, preferably smaller than 3.0 and/or larger than 1.2.

In a third principal embodiment, the ratio R" between:

- the radial distance $y_i$ of said injection orifice, defined as the minimum distance between the axis X and the center of said injection orifice; and
- the largest transverse dimension $D_C$ of the cathode in the arc chamber, is smaller than 2.5 and preferably larger than 1.25.

Whatever the principal embodiment considered, the inventors have observed that a plasma generator according to exemplary embodiments enables deposition with a very high productivity and efficiency and with a limited amount of electricity consumption and a limited contamination by the cathode.

In particular, the third principal embodiment provides excellent performance when the plasmagen gas turns around the cathode, forming a vortex.

Whatever the principal embodiment considered, preferably, a plasma generator according to exemplary embodiments may also comprise one or more features of the other principal embodiments. It may furthermore have one or more of the following optional features:

- among the set of injection orifices of said injection device, said injection orifice is that or one of those having the furthest downstream axial position;
- the axial distance x is preferably shorter than 25 mm, preferably shorter than 18 mm and/or preferably longer than 5 mm, a distance x of about 13 mm being particularly well suited;
- the axial distance x' is preferably shorter than 30 mm, preferably shorter than 25 mm and/or preferably longer than 9 mm, even longer than 15 mm, a distance x' of about 20 mm being particularly well suited;
- the radial distance $y_i$ is preferably shorter than 27 mm, preferably shorter than 20 mm, even shorter than 15 mm and/or preferably longer than 6 mm, even longer than 10 mm, a distance y of about 12 mm being particularly well suited;
- the axial distance x" separating the axial position $p_{AC}$ from the axial position $p_A$ of the furthest downstream point of the anode is preferably shorter than 60 mm, preferably shorter than 50 mm and/or preferably longer than 30 mm, a distance x" of about 45 mm being particularly well suited;
- the ratio R'" between the minimum radial distance $y_{AC}$ between the anode and the cathode in the axial position $p_{AC}$ and the largest transverse dimension $D_C$ of the cathode in the arc chamber is preferably smaller than 1.25, preferably smaller than 0.5 and preferably larger than 0.1, preferably larger than 0.2, a ratio R'" of about 0.3 being particularly well suited; and the injection device comprises a plurality of injection orifices, at least one of the conditions, and preferably all the conditions, imposed on the ratios R, R', and R", and on the distances x, x', x" and y, being true whichever injection orifice is considered.

The injection device is an injection device according to exemplary embodiments, as described below.

The cathode comprises, at its free end, a conical portion, preferably having a pointed or rounded shape. The angle δ at the apex of this conical portion is preferably larger than 30°, preferably larger than 40° and/or smaller than 75°, preferably smaller than 60°. The length, along the axis of the cathode, of the conical portion is preferably longer than 3 mm and/or shorter than 15 mm, preferably shorter than 8 mm. The largest diameter of this conical portion (at its base) is preferably larger than 6 mm, preferably larger than 8 mm and/or smaller than 14 mm, preferably smaller than 10 mm. Preferably, the free end of the conical portion is rounded, the radius of curvature of this end preferably being greater than 1 mm and/or less than 4 min.

The cathode comprises, preferably immediately upstream of the conical portion, a cylindrical portion. The cylindrical portion preferably has a length longer than 5 mm, preferably longer than 8 mm and/or shorter than 50 mm, preferably shorter than 25 mm, more preferably shorter than 20 mm, preferably shorter than 15 mm. The cylindrical portion preferably has a circular cross section and a diameter larger than 4 mm, preferably larger than 6 mm, preferably larger than 8 mm and/or smaller than 20 mm, preferably smaller than 14 mm, more preferably smaller than 10 mm. Preferably, the cylindrical portion has a diameter substantially equal to the largest diameter of the conical portion, so as to extend continuously from the latter.

Preferably, the cathode comprises, preferably immediately upstream of the cylindrical portion, a frustoconical portion. Preferably, the frustoconical portion extends as far as the back (referenced 59 in FIG. 2) of the chamber in which the electric arc is generated. Preferably, the angle at the apex γ of this frustoconical portion is larger than 10°, preferably larger than 30° and/or smaller than 90°, preferably smaller than 45°. The length of the frustoconical portion may be longer than 5 mm and/or shorter than 15 mm. Preferably, the largest diameter of the frustoconical portion is larger than 6 mm, preferably larger than 10 mm and/or smaller than 30 mm, preferably smaller than 20 mm, more preferably smaller than 18 mm and/or the smallest diameter of said frustoconical portion is larger than 4 mm, preferably larger than 6 mm, preferably larger than 8 mm and/or smaller than 20 mm, preferably smaller than 14 mm, more preferably smaller than 10 mm. Preferably, this smallest diameter is equal to the diameter of the cylindrical portion, so that the frustoconical portion prolongs the cylindrical portion.

In one embodiment, the length of the conical portion is shorter than the length of the cylindrical portion. The ratio between the length of the conical portion and the length of the cylindrical portion may in particular be larger than 0.5 and/or smaller than 1.

In one embodiment, the length of the cylindrical portion is substantially identical to the length of the frustoconical portion.

Preferably, the cathode comprises a cylindrical portion, preferably of circular cross section, preferably prolonged coaxially, into the arc chamber, by a conical portion. More preferably, the cathode comprises, coaxially, a frustoconical portion prolonged by a cylindrical portion, preferably of circular cross section, preferably prolonged, into the arc chamber, by a conical portion.

Preferably, the cathode comprises a frustoconical portion and at least one, preferably all the injection orifices are placed in one or more transverse planes cutting said frustoconical portion. In one embodiment, all the injection orifices may be located in the same transverse plane. This transverse plane may be placed, for example, at a distance from the base of the frustoconical portion (corresponding to the largest diameter of the frustoconical portion) lying between 30% and 90%, preferably between 40% and 70% of the length of the frustoconical portion.

The cathode is a blown-arc plasma cathode, preferably a rod-type hot cathode.

In one embodiment, the cathode may be a single part, i.e. made of a single material. In another embodiment, the cathode comprises a rod of tungsten and a copper part, into which the tungsten rod is inserted.

The chamber comprises a cylindrical part upstream and/or an intermediate convergent part (convergent in the downstream direction) and/or a downstream cylindrical part. The intermediate convergent part may especially be frustoconical or comprise a plurality of frustoconical parts, in particular two frustoconical parts, extending coaxially prolonging each other (i.e. without a step at the transition between these frustoconical parts). Preferably, the angle at the apex $\psi_1$ of a first frustoconical part upstream of a second frustoconical part is larger than the angle at the apex $\psi_2$ of said second frustoconical part. The angle at the apex $\psi_1$ may in particular lie between 50 and 70°, The angle at the apex $\psi_2$ may in particular lie between 10 and 20°.

Preferably, the chamber comprises in succession, and coaxially from upstream to downstream, an upstream cylindrical part, an intermediate convergent part and a downstream cylindrical part. Preferably, the length of the upstream cylindrical part is longer than 5 mm and/or shorter than 40 mm, preferably shorter than 20 mm. Preferably, the length of the intermediate convergent part is longer than 10 mm and/or shorter than 80 mm, preferably shorter than 40 mm and preferably longer than 20 mm and/or shorter than 30 mm. Preferably, the length of the downstream cylindrical part is longer than 10 mm and/or shorter than 80 mm, preferably shorter than 40 mm and preferably longer than 20 mm and/or shorter than 30 mm.

Preferably, the diameter of the upstream cylindrical part is larger than 10 mm, preferably larger than 15 mm and/or smaller than 70 mm, preferably smaller than 40 mm, preferably smaller than 30 mm.

The largest diameter of the intermediate convergent part (base) is larger than 15 mm and/or smaller than 40 mm, preferably smaller than 25 mm. Preferably, the diameter of the upstream cylindrical part is larger than the largest diameter of the intermediate convergent part, so that there is a step between these two parts.

The smallest diameter of the intermediate convergent part is larger than 4 mm, preferably larger than 5 mm and/or smaller than 20 mm, preferably smaller than 12 mm, preferably smaller than 9 mm.

The diameter of the downstream cylindrical part is larger than 4 mm, preferably larger than 5 mm and/or smaller than 20 mm, preferably smaller than 12 mm, more preferably smaller than 9 mm.

More preferably, the smallest diameter of the intermediate convergent part is substantially equal to the diameter of the downstream cylindrical part, so that the downstream cylindrical part may extend continuously the intermediate convergent part.

The length of the upstream cylindrical part is longer than the length of the frustoconical part of the cathode.

More preferably, the sum of the length of the upstream cylindrical part and of the intermediate convergent part is longer than the length of the cathode in the chamber. In one embodiment, the free end of the cathode extends substantially to halfway along the intermediate convergent part of the chamber, In particular, it may extend a distance, from the base of the intermediate convergent part, lying between 30 and 70%, preferably between 40% and 60% of the length of the intermediate convergent part.

Exemplary embodiments also relate to a plasmagen gas injection device arranged so as to create a vortex around the cathode, in particular around the downstream part of the cathode which extends into the arc chamber.

An injection device according to exemplary embodiments may also comprise one or more of the following optional features:

- the injection device is placed upstream of the part of the cathode extending into the arc chamber. The injection device may in particular be placed at the upstream end of the chamber;
- the injection device comprises at least one injection duct. Preferably, the injection device comprises at least four injection ducts, even at least 8 injection ducts;
- the diameter of the injection orifice of an injection duct is preferably larger than 0.5 mm and/or smaller than 5 mm, preferably about 2 mm;
- an injection duct is placed so that the projection of the injection axis in a radial plane passing through the center of the injection orifice of said injection duct makes an angle $\alpha$, to the axis X, larger than 10°, larger than 20° and smaller than 70° or smaller than 60°;
- an injection duct is placed so that, in an assembled position in which the injection device is integrated into a plasma generator having an axis X, the projection of the injection axis in a transverse plane passing through the center of the injection orifice of said injection duct makes an angle $\beta$ with a radius lying in said transverse plane and passing through the axis X and through the center of said injection orifice, the angle $\beta$ being smaller than 45°, preferably smaller than 30° and/or larger than 5°, preferably larger than 10°, even larger than 20°;
- a plurality of injection ducts, preferably all the injection ducts, have the same values for x and/or x' and/or $\alpha$ and/or $\beta$;
- the injection device has the shape of a ring, preferably extending along a transverse plane, the axis of the ring being the axis X; and
- the injection device comprises a plurality of injection orifices equiangularly distributed about the axis X.

Exemplary embodiments also relate to a plasma torch comprising:

- a plasma generator according to exemplary embodiments; and
- means for injecting a material to be sprayed into a plasma flux generated by said plasma generator.

The means for injecting the material to be sprayed may open into the interior of the plasma generator, and in particular into the arc chamber, or open onto the exterior of the plasma generator, in particular at the mouth of the arc chamber.

Said means for injecting the material to be sprayed may be arranged so as to inject said material to be sprayed along an axis extending in a radial plane (passing through the axis X) and forming, with a plane transverse to the axis X, an angle $\theta$, having an absolute value smaller than 40°, smaller than 30°, smaller than 20°, an angle smaller than 15° being well suited.

The injection duct may be turned inward (negative angle $\theta$, as shown in FIG. 8) relative to the plasma flux, turned outward (positive angle $\theta$), or be perpendicular to the axis X of the plasma generator ($\theta$=0, as shown in FIG. 1).

BRIEF DESCRIPTION OF THE FIGURES

Other features and advantages of the exemplary embodiments will become clearer still on reading the detailed description which follows and with regard to the appended drawings in which:

FIG. 9 shows a cathode in a preferred embodiment;

FIG. 10 shows an anode in a preferred embodiment.

In the various figures, identical references are used to denote identical or analogous elements.

The detailed description and the drawings are provided for the purposes of nonlimiting illustration.

DEFINITIONS

In the present description, the terms "upstream" and "downstream" are used relative to the flow direction of the flux of plasmagen gas.

A "transverse plane" is a plane perpendicular to the axis X.

A "radial plane" is a plane containing the axis X.

The expression "axial position" is understood to mean a position along the axis X. In other words, the axial position of a point is given by its normal projection on the axis X.

Figure 2:
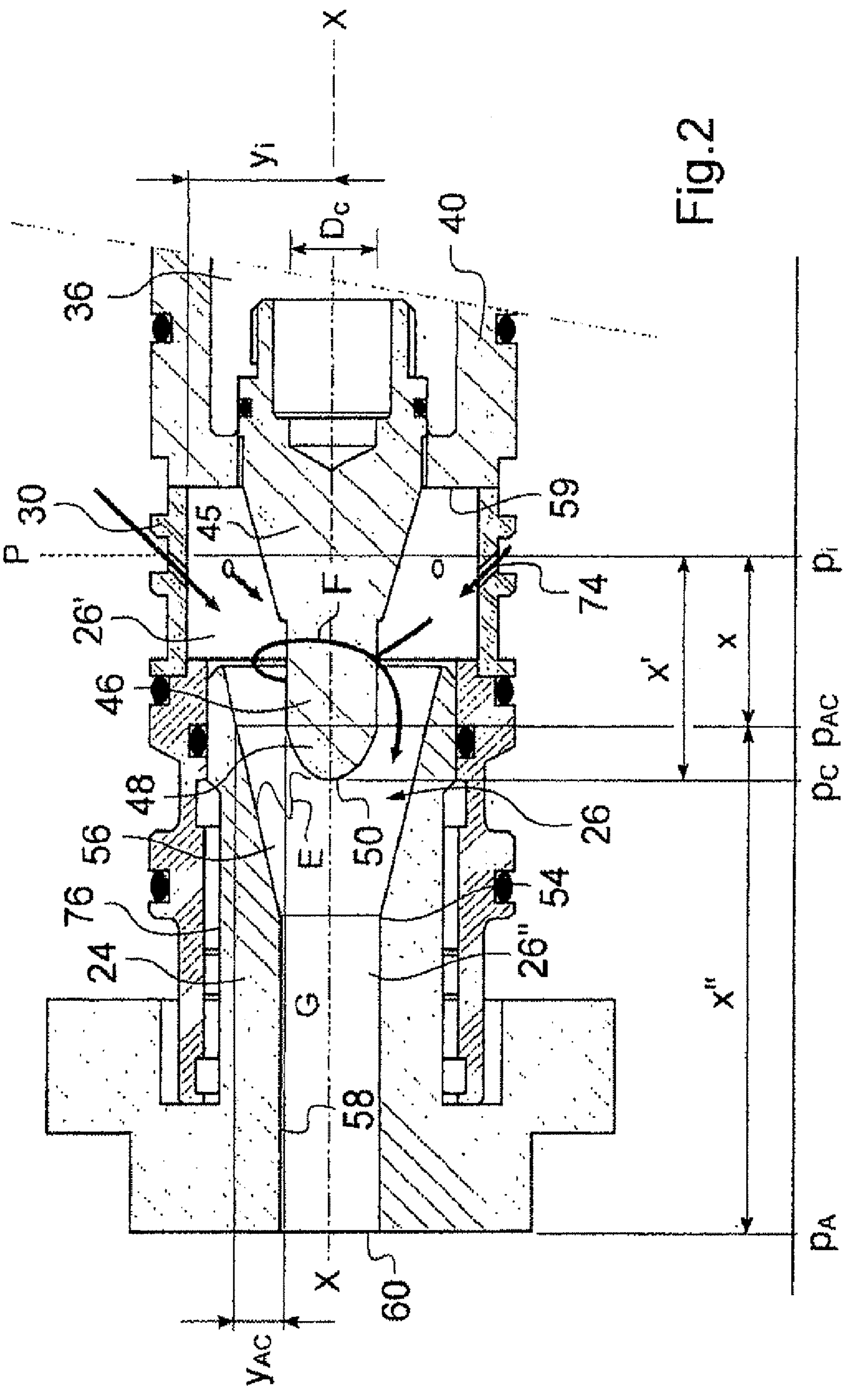
FIG. 2 shows a detail of FIG. 1.

The axial position $p_{AC}$ of minimum radial distance between the anode and cathode is defined as the position, on the axis X, of the transverse plane in which the distance between the anode and the cathode is smallest. This radial distance (i.e. measured in a transverse plane) is called the "minimum radial distance" and denoted $y_{AC}$ as shown in FIG. 2. If the distance between the anode and the cathode is a minimum in a plurality of transverse planes, the position $p_{AC}$ denotes the position of the furthest upstream plane.

The "chamber" is the volume which extends from the aperture of the outlet through which the plasma exits from said plasma generator towards the interior of the plasma generator. The chamber consists, upstream, of an "expansion chamber" into which the plasmagen gas is injected, and an "arc chamber" in which the electric are is generated. The transverse plane in the position $p_{AC}$ is considered to mark the boundary between the expansion chamber and the arc chamber.

The largest transverse dimension $D_C$ of the cathode in the arc chamber is measured taking into account only the part of the cathode which extends into the arc chamber. When, as in the preferred embodiment, the cathode comprises, extending into the arc chamber, a cylindrical portion of circular cross section ending in a conical portion forming a point, this transverse dimension corresponds to the diameter of the cylindrical portion of the cathode.

The expression "comprising a" is understood to mean "comprising at least one" unless the contrary is indicated.

DETAILED DESCRIPTION

Figure 1:
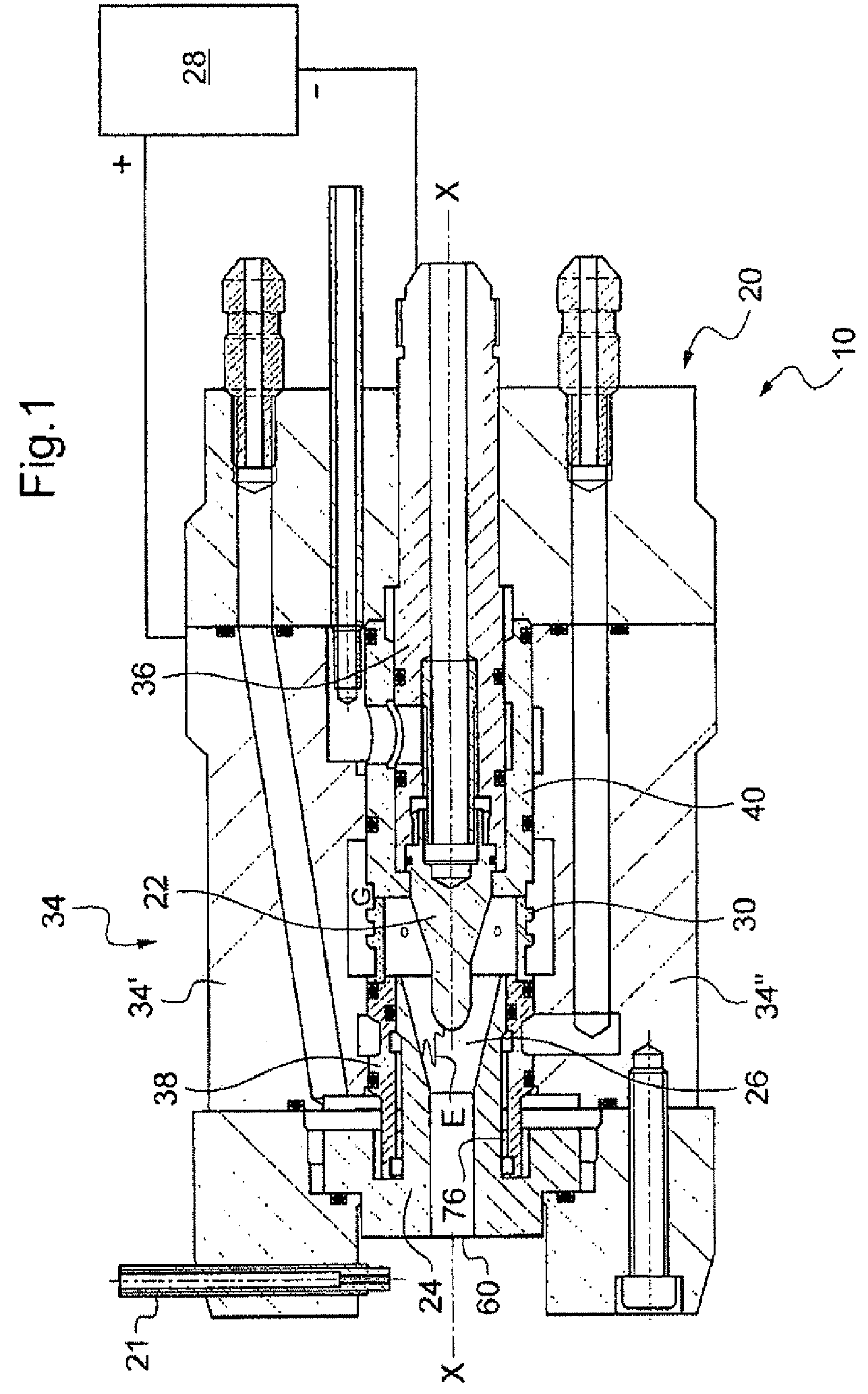
FIG. 1 shows, in longitudinal cross section, a plasma torch in an embodiment.

Reference is presently made to FIG. 1.

A plasma torch 10 comprises a plasma generator 20 and means 21 for injecting a material to be sprayed into the plasma flux produced by the plasma generator 20.

The plasma generator 20 comprises a cathode 22 extending along an axis X and an anode 24 arranged so as to enable an electric arc E to be generated, in a chamber 26, under the effect of a voltage produced by means of a power source 28. The plasma generator 20 also comprises an injection device 30 for injecting a plasmagen gas G into the chamber 26.

The plasma generator may also comprise a chamber (not shown) for regulating the pressure and pressure uniformity of the plasmagen gas, upstream of the injection device 30.

The plasma generator 20 finally comprises a body 34 for securing the other elements.

The body 34 houses a cathode holder 36 to which the cathode 22 is fastened, an anode holder 38 to which the anode 24 is fastened, and an electrically isolating body 40 placed between the assembly consisting of the cathode holder 36 and the cathode 22, on the one hand, and the assembly consisting of the anode holder 38 and the anode 24, on the other hand, so as to electrically isolate them from each other.

The body 34 is in general formed from two jackets 34' and 34" which fit closely around the anode and cathode holders and the injection device, as shown in FIG. 1. Preferably, the body 34 is a single part. In particular, in one embodiment, the injection device and the anode holder are a single part, as shown for example in FIG. 8. Advantageously, a single part makes it possible to improve the central alignment of the parts relative to the axis of the torch and makes it easier to assemble and disassemble the torch.

Figure 8:
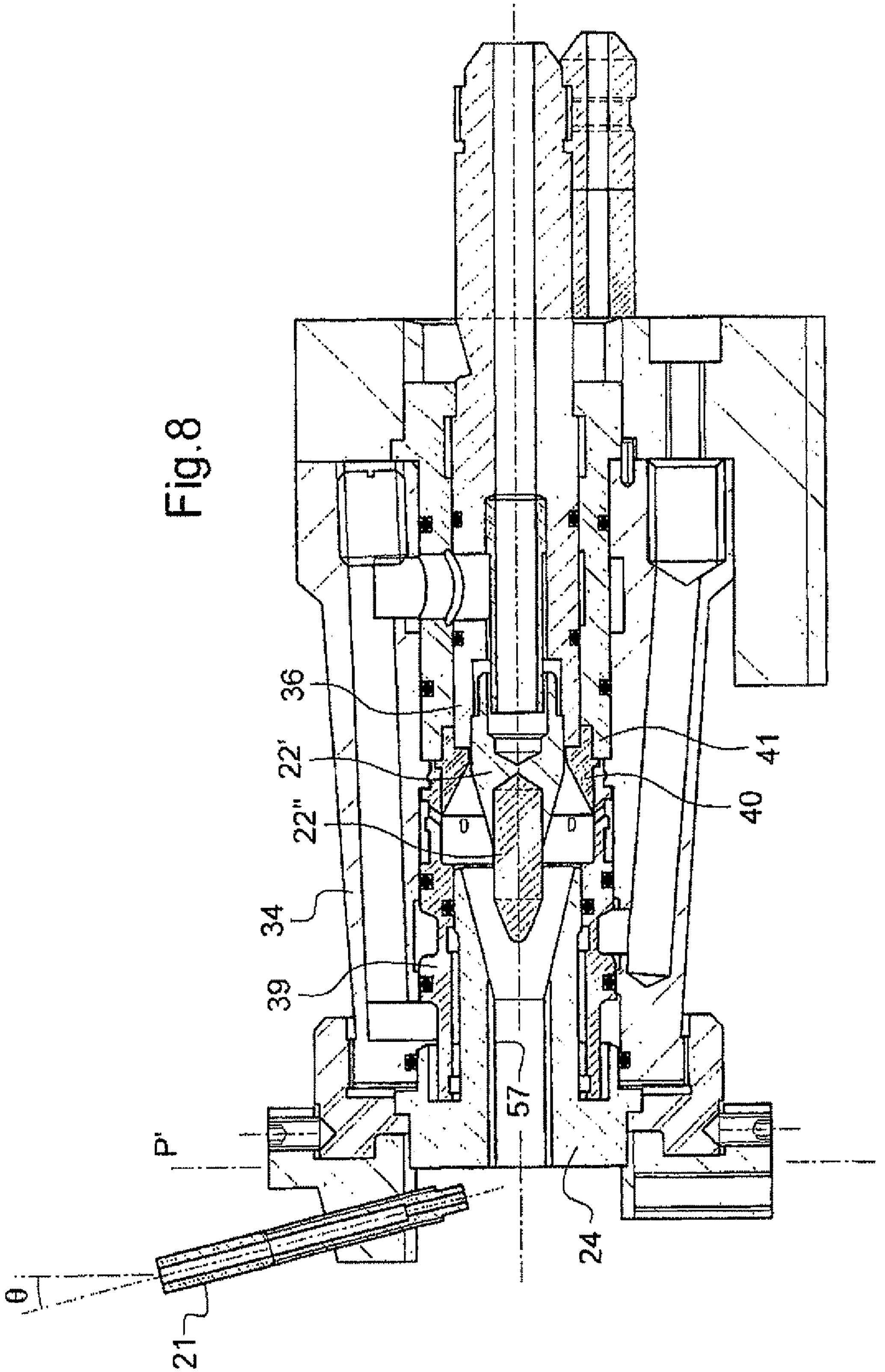

The electrically isolating body 40 preferably consists of a material that is able to withstand radiation from the plasma. The nature of the means used for the electrical isolation may also be selected depending on the local temperature. For example, as shown in FIG. 8, an isolating part 41 of reduced thermal resistance may be placed in the region which is not directly exposed to the plasma.

The cathode holder 36 and the anode holder 38 are at the same electrical potential as the cathode 22 and the anode 24, respectively. However, the cathode 22 and the anode 24 may be consumables made of copper and tungsten whereas the cathode body 36 and anode body 38 may be made of a copper alloy.

The + and − terminals of the power source 28 are connected directly or indirectly to the anode 24 and cathode 22, respectively. The power source 28 is able to generate, between the anode and the cathode, a voltage higher than 40 V and/or lower than 120 V.

FIG. 2 shows that the cathode 22, in the shape of a rod of axis X, comprises in succession, coaxially, from upstream to downstream, a frustoconical portion 45 of decreasing diameter, a cylindrical portion 46 of circular transverse cross section and a conical portion 48 with a rounded apex.

In one embodiment, the cylindrical portion has a diameter larger than 5 mm, larger than 6 mm and/or smaller than 11 mm, smaller than 10 mm, a diameter of about 8 mm being well suited.

The diameter of the cylindrical portion 46, denoted $D_C$, is called the "diameter of the cathode", and is preferably about 8 mm. The axial position of the downstream end 50 of the cathode 22 is referenced $p_C$ herein below.

The cathode 22 may be made of tungsten, optionally doped with a dopant that reduces the work function of the metal of the cathode relative to the work function of tungsten. The tungsten may in particular be doped with thorium oxide and/or lanthanum oxide and/or cerium oxide and/or yttrium oxide. This advantageously makes it possible to increase the current density at the melting point of the metal or reduce the operating temperature by a few hundred degrees Celsius, relative to a pure tungsten cathode.

The cathode may or may not be made of a single material. For example, in FIG. 8 the cathode 22 comprises a rod 22" made of tungsten, whether doped or not, and a part made of copper 22' for fastening to the cathode holder.

The anode 24 takes the form of a sleeve of axis X, the internal surface 54 of which comprises in succession, from upstream to downstream, a frustoconical portion 56 and a cylindrical portion 58 of circular cross section.

In the same way as the cathode, the anode may or may not be made of a single material.

In order to reduce erosion of the anode by the arc root of the plasma column, at least part of the internal surface 54 of the anode, and in particular downstream of the arc initiation zone (located on the frustoconical portion 56), is made of a refractory conductive metal, preferably of tungsten.

The internal surface of the cylindrical portion 58 of the anode may also be protected by a coating or a sleeve 57, for example made of tungsten, as shown in FIG. 8.

The axial position of the anode 24 is such that part of the cylindrical portion 46 and the conical portion 48 of the cathode 22 are placed facing the frustoconical portion 56, i.e. in the volume of the chamber 26 bounded radially by the frustoconical portion 56.

In the embodiment shown in FIG. 1, the axial position $p_{AC}$ is located substantially level with the junction between the cylindrical portion 46 and the conical portion 48 of the cathode 22.

The chamber 26 comprises in succession, from upstream to downstream, an expansion chamber 26' extending axially from the back 59 of the chamber 26 as far as the position $p_{AC}$, then an arc chamber 26" extending axially from the position $p_{AC}$ as far as the position $p_A$ of an outlet aperture 60 bounded by the downstream end of the anode, and through which the plasma exits from the plasma generator.

Preferably, the diameter of the outlet aperture 60 is larger than 4 mm, preferably larger than 5 mm and/or smaller than 15 mm, preferably smaller than 9 mm.

Figure 4:
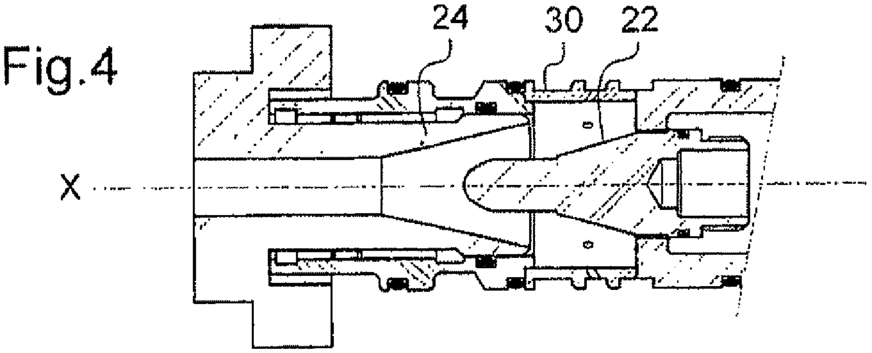
FIGS. 4, 5, 6 and 8 show, in longitudinal cross section, variants of plasma torches according to exemplary embodiments.

The chamber 26 may open onto the outlet aperture 60 via a nozzle that preferably extends along the axis X and the diameter of which may vary depending on the position of the transverse cross section considered, as shown for example in FIG. 4, or be constant, as shown in FIG. 1.

Figure 3B:
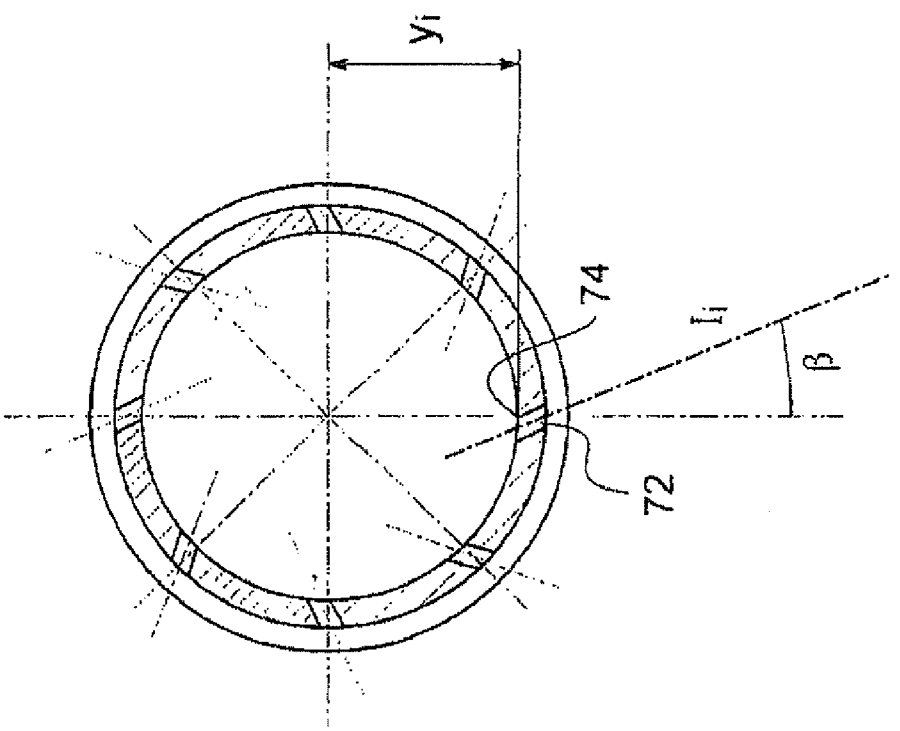
FIGS. 3*a* and 3*b* show, in longitudinal cross section and in transverse cross section (along the plane A-A shown in FIG. 3*a*), a plasmagen gas injection device employed in the plasma torch in FIG. 1.
Figure 3A:
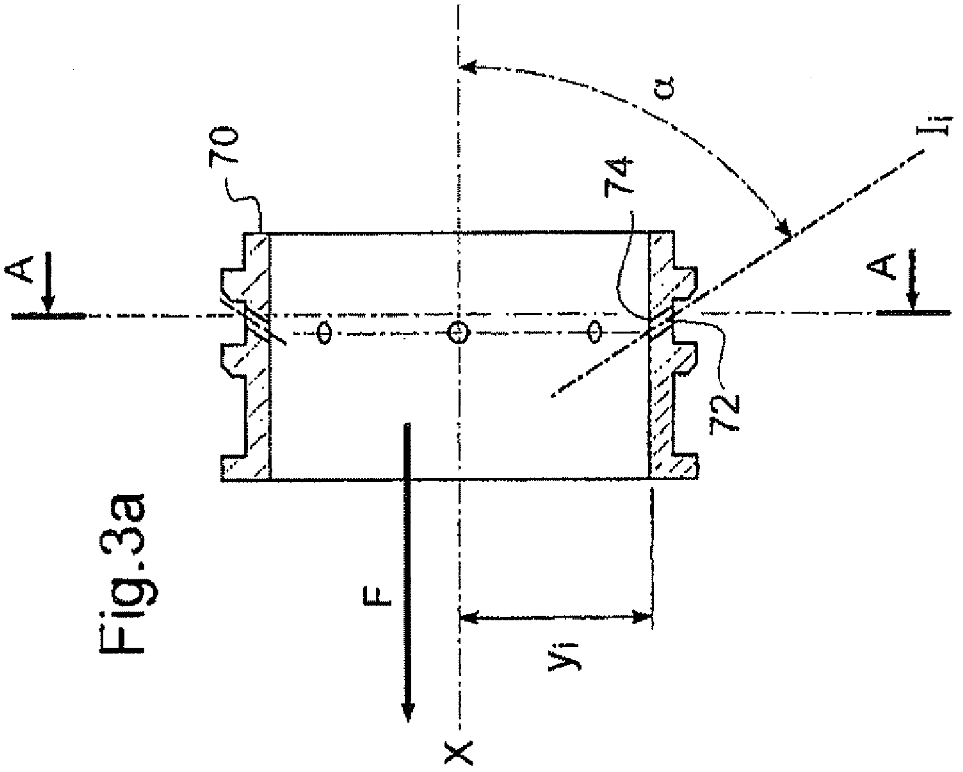

The injection device 30, shown in greater detail in FIGS. 3*a* and 3*b*, is arranged and located so as to create a gas flux that turns about the cylindrical portion 46, even about the conical portion 48, of the cathode 22. Preferably, the injection device 30 takes the form of a ring of axis X.

The lateral wall 70 of this ring is pierced with eight substantially rectilinear injection ducts 72. Each injection duct 72 opens towards the interior of the ring via an injection orifice 74. The center of an injection orifice 74 defines the axial position $p_i$ and the radial distance $y_i$ of this injection orifice.

The transverse cross section of an injection duct 72 is substantially cylindrical and has a diameter D lying between 0.5 mm and 5 mm.

The radial distance $y_i$ between the axis X and the center of any one of the injection orifices is constant. It is preferably longer than 10 mm and/or shorter than 20 mm, a radial distance $y_i$ of about 12 mm being well suited.

The injection orifices 74 are located in the same transverse plane P (in a cross section A-A). They all have the same diameter D, the same axial position p ($=p_i$) and the same radial distance y ($=y_i$).

An injection duct 72 opens, towards the axis of the ring, along an injection axis $I_i$. In a radial plane passing though the center of the injection orifice 74, the projection of the injection axis $I_i$ makes, with the axis X, an angle $\alpha$ of 45°, as shown in FIG. 3*a*.

In a transverse projection plane, passing through the center of the injection orifice 74, the injection axis $I_i$ makes, with a radius passing through the axis X and the center of said injection orifice 74, an angle $\beta$ of 25°, as shown in FIG. 3*b*.

The injection device 30 is placed in the expansion chamber 26'.

The axial distance between the axial position $p_{AC}$ of minimum radial distance between the cathode 22 and the anode 24 and the position p of the injection orifices in the furthest downstream plane P is denoted x. The ratio R between x and the diameter $D_C$ of the cylindrical portion 46 of the cathode 22 is denoted R ($R=p_{AC}/D_C$). In the embodiment of FIG. 1 or of FIG. 2, x is about 15 mm and the ratio R is about 1.88.

The axial distance separating the axial position $p_C$ of the downstream end 50 of the cathode 22 and the position p is denoted x'. The ratio between x' and the diameter $D_C$ of the cathode 22 is denoted R' ($R'=x'/D_C$). In the embodiment of FIG. 1 or of FIG. 2, x' is equal to about 20 mm and the ratio R' is 2.5.

Finally, the ratio between the radial distance y between the axis X and the injection ducts 72 and the diameter Dc of the cathode 22 is denoted R" ($R''=y/D_C$). In the embodiment of FIG. 1 or FIG. 2, y is equal to about 13 mm and the ratio R" is equal to about 1.63.

Without being bound to one theory, the inventors have observed that when at least one of the ratios R, R' and R" is such as defined in exemplary embodiments, the performance of the plasma torch is particularly good, especially when the plasmagen gas is injected upstream of the cathode, and in particular injected so as to be able to turn about the cathode. The use of an injection device according to exemplary embodiments has been shown to be particularly advantageous for this purpose. According to exemplary embodiments, the plasmagen gas is injected very close to the downstream end of the cathode. The jet of plasmagen gas is little slowed over this short distance and the plasmagen gas is also cooler when it reaches the arc. It therefore preserves a high viscosity making sustaining and lengthening the arc easier and thus making it possible to increase the power of the plasma generator. In addition, the rotation of the gas about the cathode also advantageously enables wear of the electrodes to be limited.

The plasmagen gas G, the flow of which is shown in FIG. 2 by the arrow F, is preferably a gas chosen from argon and/or hydrogen and/or helium and/or nitrogen.

The plasma generator 20 also comprises cooling means able to cool the anode 24 and/or the cathode 22 and/or the cathode holder 36 and/or the anode holder 38. In particular these cooling means may comprise means for circulating a coolant, for example water, preferably in a turbulent state, the Reynolds number defining the turbulent state of this fluid possibly being preferably higher than 3000, more preferably higher than 10000.

A cooling chamber 76 of axis X may in particular be housed in the anode holder 38 so as to permit the coolant to circulate near the anode 24.

The cooling means may also be common to the body 34, the anode and the cathode, as shown in FIG. 8.

Figure 5:
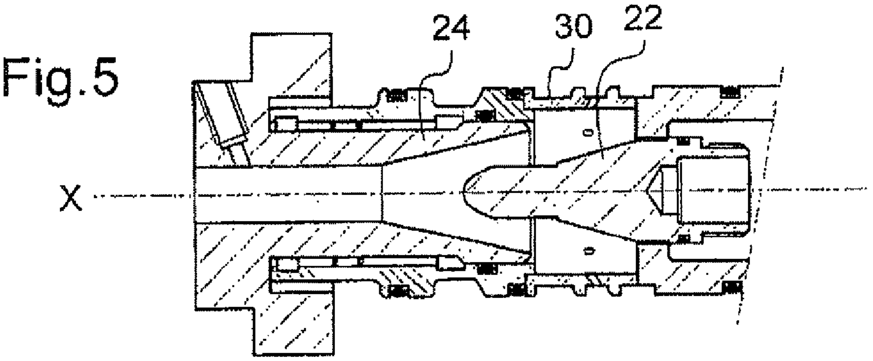

The plasma torch 10 comprises, in addition to the plasma generator 20, injection means 21 placed, in the embodiment shown, so as to inject particles to be sprayed near the outlet aperture 60 of the chamber 26. All the injection means used, internal or external to the arc chamber 26", may be envisioned. Thus the means for injecting particles to be sprayed are not necessarily external to the plasma generator, but may be integrated therein, as shown in FIG. 5.

In the embodiment shown in FIG. 1, the injection means 21 are placed so that at least some of the material to be sprayed is injected towards the axis X along an axis making, to a transverse plane P', an angle $\theta$ of about 0°. In FIG. 8, the angle $\theta$ is about 15°.

FIG. 9 shows a variant of the cathode 22.

The cathode 22 comprises a rod 22" made of tungsten and a copper part 22', in which the rod 22" made of tungsten is inserted.

An upstream part 22*a* and a downstream part 22*b* of the cathode may be seen, intended to extend out of the chamber 26 and into the chamber 26, respectively (see for example FIG. 2). In the remainder of the description, only the downstream part 22*b* is described. The free end of the downstream part 22*b* is formed from a conical portion 82 having a rounded point. The radius of curvature of this end is larger than 1 mm and smaller than 4 mm. The angle at the apex $\delta$ of this conical portion is about 45°. The length $L_{82}$, along the axis of the cathode, of the conical portion 82 is larger than 3 mm and smaller than 8 mm. The largest diameter $D_{82}$ of this conical portion (at its base) is larger than 6 mm and smaller than 10 mm.

The cathode 22 comprises, immediately upstream of the conical portion 82, a cylindrical portion 84 of circular cross section, having a diameter equal to $D_{82}$. The cylindrical portion 84 has a length $L_{84}$ longer than 5 mm and shorter than 15 mm.

The cathode also comprises, immediately upstream of the cylindrical portion 84, a frustoconical portion 86. The angle at the apex $\gamma$ of this frustoconical portion 86 is larger than 30° and smaller than 45°. The length $L_{86}$ of the frustoconical portion 86 is longer than 5 mm and shorter than 15 mm. The largest diameter $D_{86}$ of the frustoconical portion 86 is larger than 6 mm and/or smaller than 18 mm. The smallest diameter of said frustoconical portion 86 is substantially equal to $D_{82}$, so that the frustoconical portion 86 prolongs the cylindrical portion 84.

Preferably, the cathode is arranged so that in operation, at least one, preferably all, of the injection orifices are located in a transverse plane Pi cutting said frustoconical portion 86. In one embodiment, this plane is located a distance "z" from the base of the frustoconical portion 86 lying between 30% and 90% of the length $L_{86}$ of the frustoconical portion 86.

FIG. 10 shows a variant of the anode 24. This anode comprises a first part 24*a* made of copper or a copper alloy and a second part 24*b* made of tungsten or a tungsten alloy. The second part 24*b* is inserted in the first part 24*a* so as to define with it a downstream part of the chamber 26, extending downstream of an upstream cylindrical part 26*a*, drawn with dashed lines, and defined by the injection device 30.

The second part 24*b* is in particular intended to define the arc chamber.

The downstream part of the chamber 26 comprises in succession, from upstream to downstream, an intermediate convergent part 26*b* (converging in the downstream direction) and a downstream cylindrical part 26*c*.

The intermediate convergent part 26*b* comprises first and second frustoconical parts 26*b*' and 26*b*", extending coaxially and prolonging each other. The angle $\psi_1$ at the apex of the first frustoconical part 26*b*' upstream of a second frustoconical part, of between 50 and 70°, is larger than the angle $\psi_2$ at the apex of said second frustoconical part 26", of between 10 and 20°.

The length $L_{26a}$ of the upstream cylindrical part 26*a* lies between 5 and 20 mm.

The length $L_{26b}$ of the intermediate convergent part 26*b* is about 24 mm.

The length $L_{26b'}$ of the first frustoconical part 26*b*' lies between 2 and 10 mm, for example about 5 mm.

The length $L_{26c}$ of the downstream cylindrical part 26*c* lies between 20 and 30 mm.

The diameter $D_{26a}$ of the upstream cylindrical part 26*a* is larger than 10 mm and smaller than 30 mm.

The largest diameter $D_{26b}$ of the intermediate convergent part 26*b* (base) is about 18 mm.

The diameter $D_{26a}$ of the upstream cylindrical part is larger than the largest diameter $D_{26b}$ of the intermediate convergent part, so that there is a step 80 between these two parts.

The smallest diameter $d_{26b}$ of the intermediate convergent part 26*b* is larger than 4 mm and smaller than 9 mm.

The diameter of the downstream cylindrical part 26*c* is equal to $d_{26b}$.

Preferably, the length $L_{26a}$ of the upstream cylindrical part 26*a* is longer than the length $L_{86}$ of the frustoconical portion 86 of the cathode 24. More preferably, the sum ($L_{26a}$+$L_{26b}$) of the length of the upstream cylindrical part 26*a* and of the intermediate convergent part 26*b* is greater than the length $L_{22b}$ of the cathode 22 in the chamber 26. When the cathode 22 is installed in its operating position in the chamber 26 defined by the anode 22, the free end of the cathode preferably extends substantially to half-way along the intermediate convergent part of the chamber.

The operation of a plasma torch according to exemplary embodiments is similar to that of related art plasma torches. A voltage is generated by a power supply 28 across the cathode 22 and the anode 24 so as to create an electric arc E. Plasmagen gas G is then injected with a flow rate of typically higher than 30 l/min and lower than 100 l/min, at a temperature higher than 0° C. and lower than 50° C., and at an absolute pressure lower than 10 bars by means of the injection device 30 upstream of the downstream end 50 of the cathode 22. The flux of plasmagen gas G turns about the cathode 22 as it progresses into the chamber 26 towards the outlet aperture 60. By passing through the electric arc E, the plasmagen gas G is converted into plasma at a very high temperature, typically at a temperature higher than 8000 K, even higher than 10000 K. The plasma flux exits from the chamber 26, substantially along the axis X, at a velocity typically higher than 400 m/s and lower than 800 m/s.

Simultaneously, the material to be sprayed is injected, in the form of particles, into the plasma flux by means of injection means 21.

The material to be sprayed may in particular be a mineral, metal and/or ceramic and/or cermet powder, even an organic powder, or optionally a liquid such as a suspension or a solution of the material to be sprayed.

This material is then carried along by the plasma flux and heated, even melted by the heat of the plasma. When the plasma torch 10 is directed towards a substrate, the material is thus sprayed against this substrate. During cooling the material solidifies and adheres to the substrate.

EXAMPLES

The following examples are provided for the purposes of illustration and do not limit the scope of the exemplary embodiments.

Two plasma torches T1 and T2, similar to that shown in FIG. 8, were compared to two related art torches, an "F4" torch and a latest-generation tricathode torch. The operating conditions (electrical parameters, composition of the plasmagen gas, powder injection flow rate, spraying distance) of the two related art torches corresponded to the nominal conditions recommended by the manufacturer or to conditions considered as being even better. The operating conditions of the plasma torches T1 and T2 were chosen so as to obtain the best possible performance.

Table 1 below collates the technical features of the plasma torches tested and the test conditions. The two related art plasma torches had orifices for injecting plasmagen gas which opened onto the back of the chamber. The dimensional parameters defining the injection device for the plasmagen gas according to exemplary embodiments therefore did not apply to these two plasma torches.

TABLE 1

| Plasma Torch | | T1 | T2 | Related art "F4" torch | Latest-generation tricathode torch |
|---|---|---|---|---|---|
| Position of the device for injecting the plasmagen gas relative to the cathode | | lateral | lateral | from the back | from the back |
| Device for injecting the plasmagen gas | Angle α | 45° | 45° | Not applicable | Not applicable |
| | Angle β | 25° | 0° | | |
| | x (= $p_{AC} - p_i$) | 13 mm | 13 mm | | |
| | R (= $x/D_C$) | 1.6 | 1.6 | | |
| | x' (= $p_C - p_i$) | 20 mm | 20 mm | | |
| | R' (=$x'/D_C$) | 2.5 | 2.5 | | |
| | y | 12.5 mm | 12.5 mm | | |
| | R" (= $y/D_C$) | 1.75 | 1.75 | | |
| Arc chamber | Cathode diameter ($D_C$) | 8 mm | 8 mm | | |
| | R"' (=$y_{AC}/D_C$) | 0.3 | 0.3 | | |
| | x" (=$p_A - p_{AC}$) | 43.5 mm | 43.5 mm | | |

TABLE 1-continued

| | Plasma Torch | T1 | T2 | Related art "F4" torch | Latest-generation tricathode torch |
|---|---|---|---|---|---|
| | Outlet aperture diameter (cylindrical channel) | 6.5 mm | 6.5 mm | | 9 mm |
| Power source | Current (A) | 750 | 700 | 630 | 530 |
| | Voltage (V) | 72 | 66 | 68.5 | 103 |
| | Power (kW) | 54 | 46.2 | 43 | 55 |
| Plasmagen gas | Argon (l/min) | 50 | 40 | 38 | 30 |
| | Hydrogen (l/min) | 16 | 12 | 13 | 0 |
| | Helium (l/min) | 0 | 0 | 0 | 35 |
| Powder spraying | Carrier gas | Ar | Ar | Ar | Ar |
| | Carrier gas flow rate (l/min) | 3 × 4 ± 1 | 1 × 4.5 ± 1 | 3.2 | 3 × 3.5 |
| | Powder injection flow rate (g/min) | 120 | 45 | 40 | 100 |
| | Spraying distance (outlet aperture-substrate distance) (mm) | 140 | 120 | 110 | 90 |
| | Orifice diameter for injection of the powder to be sprayed | 2 mm | 2 mm | 1.5 mm | 1.8 mm |
| | Distance between the means for injecting the powder and the axis of the torch | 9 mm | 9 mm | 6 mm | 6.5 mm |
| | Injection angle relative to the axis of the torch | 90° | 90° | 90° | 90° |
| | Powder composition sprayed | Chromium oxide | | Chromium oxide | |
| | Particle size of the powder sprayed | 17-45 μm | | 17-45 μm | |
| Results | Deposition efficiency (%) | 52 | 45 | 40 | 50 |
| | Productivity (g/min) | 62.4 | 20 | 16 | 50 |
| | Amount of energy consumed per kg deposited (kWh) | 14.4 | 38.5 | 44.8 | 18.3 |

As is clearly shown, a plasma torch according to exemplary embodiments makes it possible to achieve a particularly high efficiency and productivity with reduced energy consumption.

Comparing the performance of the plasma torches T1 and T2 shows that the plasma torch T1 makes it possible to obtain, for a deposition efficiency that is similar (52%) or even higher (deposition efficiency of T2: 45%), a productivity (higher than 62%) that is more than three times greater than that of the plasma torch T2 (about 20%) for which the angle β is zero.

Wear measurements have shown that, at equivalent powers, the wear of the electrodes of one plasma torch according to exemplary embodiments, in particular with the angles α and β such as described above, is lower than that of the related art torches, and in particular that of the electrodes of the F4 plasma torch. Advantageously, contamination with copper and/or tungsten of the deposited layer is thereby reduced.

Of course, the invention is not limited to the embodiments described and shown. In particular, a plasma torch according to exemplary embodiments may be of any known type, in particular of the "blown-arc plasma" or "hot cathode" type, especially a "rod-type hot cathode".

The number and the shape of the anodes and cathodes are not limited to those described and shown.

In another embodiment, the plasma generator comprises a plurality of anodes and/or a plurality of cathodes, and in particular at least three cathodes. Preferably however, the plasma generator comprises a single cathode and/or a single anode.

Advantageously, the plasma generator is easier to control.

The shape of the chamber is also nonlimiting.

The injection device may also be different to that shown in FIG. 1.

For example, it may comprise a single ring or a plurality of rings.

The number of injection ducts is nonlimiting. Their cross section is not necessarily circular, and could be, for example, oblong or polygonal, in particular rectangular.

Figure 6:
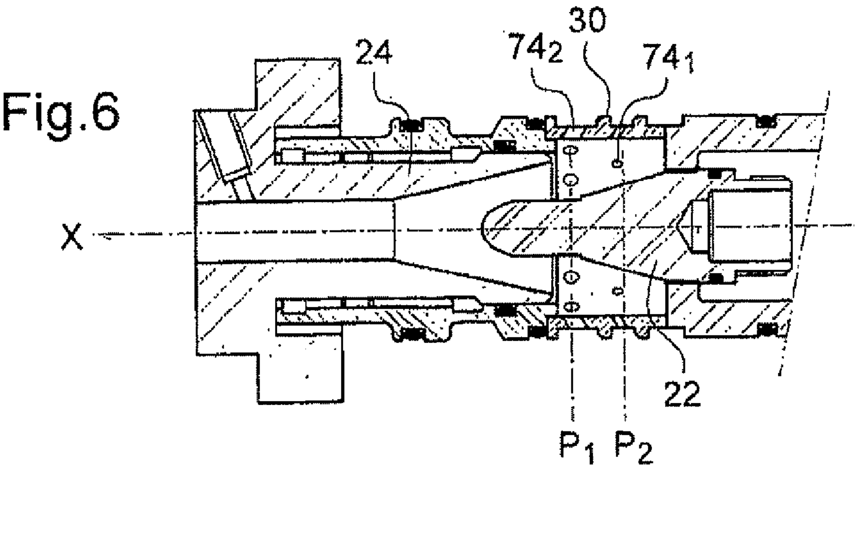
Figures 7A, 7B, 7C:
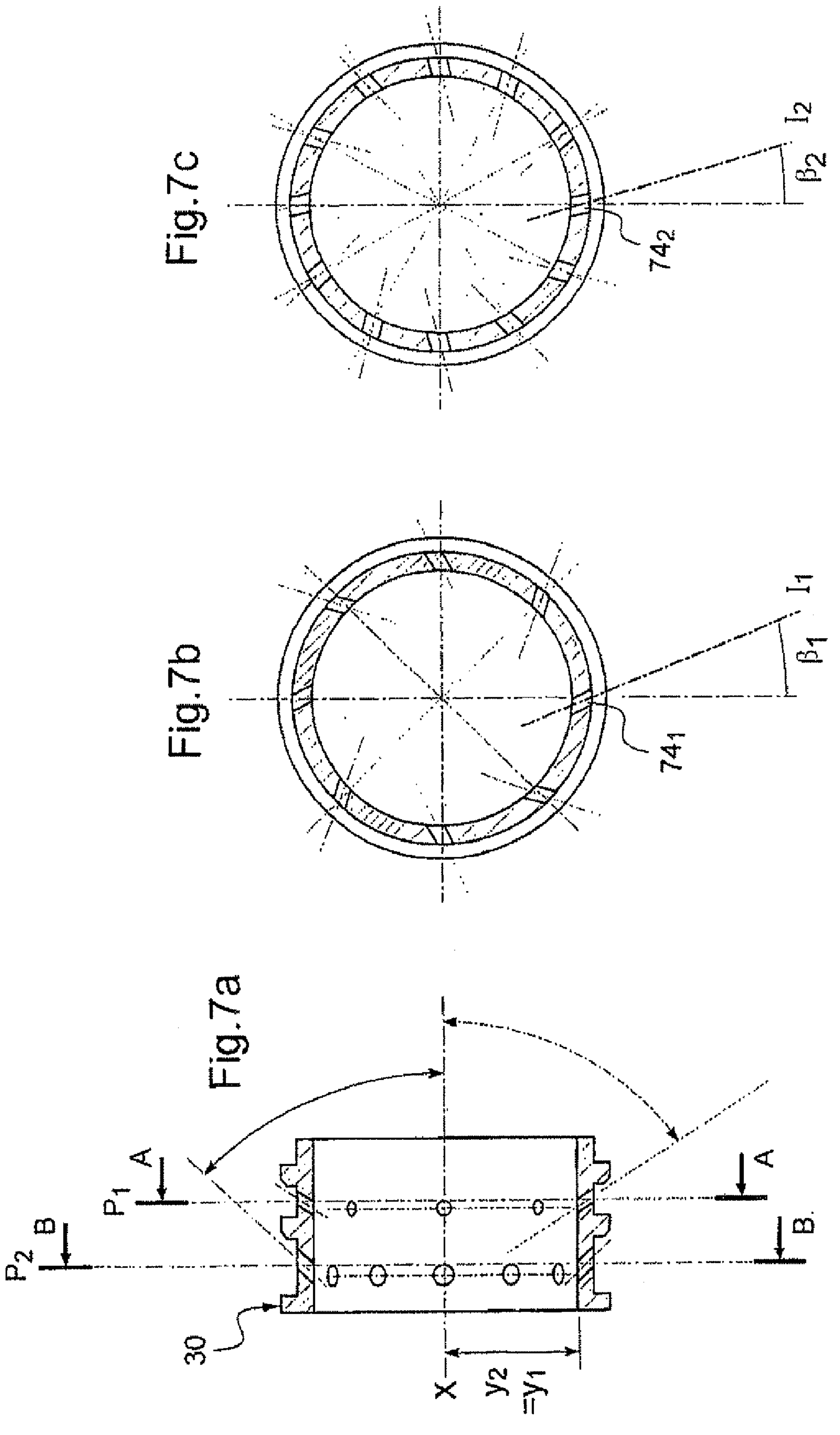
FIG. 7*a* shows in longitudinal cross section a plasmagen gas injection device employed in the variant of the plasma torch according to FIG. 6 and FIGS. 7*b* and 7*c*, showing this device in transverse cross section along the planes A-A and B-B shown in FIG. 7*a*, respectively.

The arrangement of the injection ducts could also be different to that shown in FIG. 1. The injection ducts could for example be arranged in a helix pattern or, more generally, placed so that the injection orifices are not all in the same transverse plane. They could especially lie in two (as shown in FIG. 6), three, four or more transverse planes. In the injection device shown in FIG. 6 and detailed in FIGS. 7*a*, 7*b* and 7*c*, twenty injection orifices 74 are distributed in the first and second transverse planes $P_1$ and $P_2$. Eight injection orifices $\mathbf{74}_1$, equiangularly distributed about the axis X, lie in the first transverse plane $P_1$. They all have the same diameter $D_1$ and the same radial distance $y_1$. The projection of an injection axis $I_1$ of an injection orifice $\mathbf{74}_1$ in a transverse plane makes an angle $\beta_1$ with a radius extending in said transverse plane and passing through the axis X and through the center of said injection orifice.

The twelve other equiangularly distributed injection orifices $\mathbf{74}_2$ lie in the second transverse plane $P_2$ downstream of $P_1$, and have the same diameter $D_2$, larger than $D_1$, and the same radial distance $y_2$, equal to $y_1$. The projection of an injection axis $I_2$ of an injection orifice $\mathbf{74}_2$ in a transverse plane makes an angle $\beta_2$ with a radius extending in said transverse plane and passing through the axis X and through the center of said injection orifice. The angle $\beta_2$ is smaller than the angle $\beta_1$.

Preferably, the ratio of the cumulated cross section S1 of the orifices $\mathbf{74}_1$ and the cumulated cross section S2 of the orifices $\mathbf{74}_2$ (=S1/S2) lies between 0.25 and 4.0. The expression "cumulated cross section" is understood to mean the sum of areas of all the cross sections of a set of orifices.

In another embodiment $y_1$ could be different to $y_2$. The orifices belonging to a given transverse plane could also have radial distances $y_i$ that differ one from the other.

The injection orifices could also be grouped in groups of two, three or more. Thus, in one embodiment, the injection device may comprise four pairs of holes, said pairs preferably being equiangularly distributed.

When the injection orifices are placed in a plurality of transverse planes, the injection orifices of a first plane may be aligned along the direction of the axis X or offset with those of a second plane, for example angularly offset by a constant angle.

The invention claimed is:

1. A plasma torch comprising:

a plasma generator having:

a cathode extending along an axis X, an anode, and a chamber, the cathode and the anode being placed so as to be able to generate an electric arc in the chamber when voltage is applied between the anode and the cathode; and an injection device for injecting a plasmagen gas, the injection device comprising an injection duct opening, along an injection axis ($I_i$), via an injection orifice, into the chamber;

means for injecting a material to be sprayed into a plasma flux generated by said plasma generator;

wherein, a ratio R" between:

a radial distance ($y_i$) of said injection orifice, defined as a minimum distance between the axis X and a center of said injection orifice; and a largest transverse dimension ($D_C$) of the cathode in a region of the chamber downstream of an axial position $p_{AC}$, $p_{AC}$ denoting the axial position of minimum radial distance between the anode and cathode, is smaller than 2.5, and a projection of the injection axis ($I_i$) in a transverse plane passing through the center of the injection orifice of said injection duct defines an angle β smaller than 45° with a radius lying in said transverse plane and passing through the axis X and through the center of said injection orifice.

2. The plasma torch according to claim 1, in which the projection of the injection axis ($I_i$) in a radial plane passing through the center of the injection orifice of said injection duct makes an angle α, with the axis X, larger than 10° and smaller than 70°.

3. The plasma torch according to claim 1, in which said angle β is larger than 5°.

4. The plasma torch according to claim 1, in which:

the angle α is larger than 20° and smaller than 60°; and/or the angle β is smaller than 30°.

5. The plasma torch according to claim 1, in which, among a set of injection orifices of said injection device, said injection orifice is that or one of those having a furthest downstream axial position ($p_i$).

6. The plasma torch according to claim 1, in which a radial distance ($y_i$) of said injection orifice is shorter than 27 mm and longer than 6 mm.

7. The plasma torch according to claim 1, in which the injection device is placed upstream of the position $p_{AC}$ of minimum radial distance between the anode and cathode.

8. The plasma torch according to claim 1, in which the cathode comprises a frustoconical portion and in which said injection orifice is placed in a transverse plane cutting said frustoconical portion.

9. The plasma torch according to claim 5, in which the cathode comprises a frustoconical portion and all of the injection orifices are placed in one or more transverse planes cutting said frustoconical portion.

10. The plasma torch according to claim 8, in which said transverse plane or planes are placed at a distance from a base of said frustoconical portion lying between 30% and 90% of the length of said frustoconical portion.

11. The plasma torch according to claim 1, in which an axial distance x" separating the axial position $p_{AC}$ from an axial position ($P_A$) of the furthest downstream point of the anode is longer than 30 mm.

12. The plasma torch according to claim 11, in which the axial distance x" separating the axial position $p_{AC}$ from the axial position ($p_A$) of the furthest downstream point of the anode is shorter than 60 mm.

13. The plasma torch according to claim 1, in which the ratio R between:

an axial distance x between the axial position $p_{AC}$ of minimum radial distance between the anode and cathode and an axial position ($p_i$) of said injection orifice; and a largest transverse dimension ($D_C$) of the cathode in a region of the chamber downstream of the axial position $p_{AC}$, is smaller than 3.2.

14. The plasma torch according to claim 13, in which the axial distance x is longer than 5 mm and shorter than 25 mm.

15. The plasma torch according to claim 1 claims, in which a ratio R' between:

an axial distance x' separating an axial position $p_C$ of a downstream end of the cathode and an axial position ($p_i$) of said injection orifice; and the largest transverse dimension ($D_C$) of the cathode in the region of the chamber downstream of the axial position $p_{AC}$ of minimum radial distance between the anode and cathode, is smaller than 3.5.

16. The plasma torch according to claim 15, in which the axial distance x' is longer than 9 mm and shorter than 30 mm.

17. The plasma torch according to claim 1, in which a ratio R'" between a minimum radial distance $y_{AC}$ between the anode and the cathode in the axial position $p_{AC}$ and the largest transverse dimension ($D_C$) of the cathode in the region of the chamber downstream of the axial position $p_{AC}$ of minimum radial distance between the anode and cathode is smaller than 1.25.

18. The plasma torch according to claim 1, in which the injection device comprises a plurality of injection orifices, at least one of conditions on ratios R, R', and R", and on distances x, x', x" and $y_i$, being true whichever injection orifice is considered.

19. The plasma torch according to claim 1, comprising a single cathode and/or a single anode.

20. The plasma torch according to claim 1, in which the cathode, in the form of a rod of axis X, comprises in succession, coaxially, from upstream to downstream, a frustoconical portion of decreasing diameter, a cylindrical portion of circular cross section and a conical portion having a rounded apex.

* * * * *